July 26, 1938.                L. R. MARTIN                2,124,883
INDICATING SYSTEM FOR MOTION PICTURE APPARATUS
Filed June 11, 1935
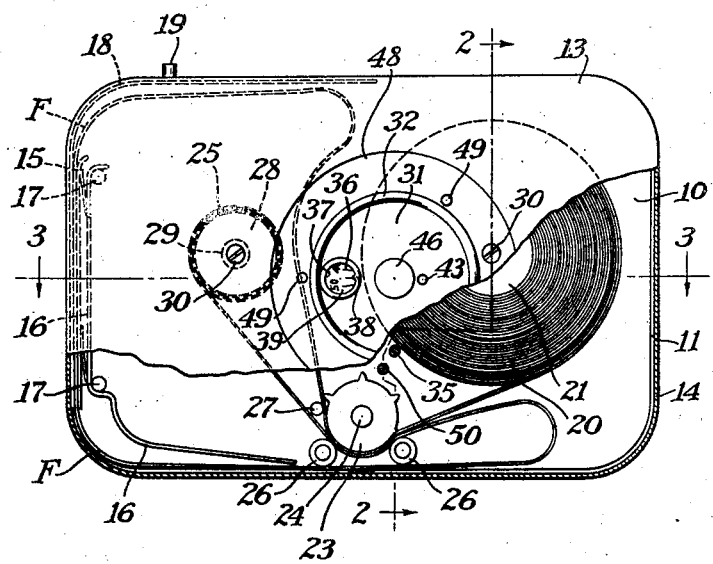
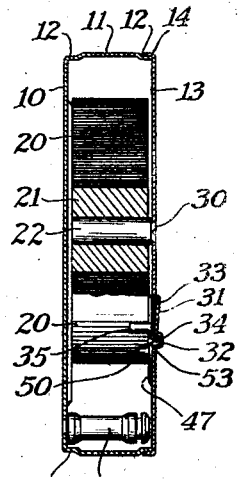
INVENTOR.
Lawrence R. Martin
BY
ATTORNEYS Patented July 26, 1938

2,124,883

UNITED STATES PATENT OFFICE 2,124,883

INDICATING SYSTEM FOR MOTION PICTURE APPARATUS

Lawrence R. Martin, Rochester, N. Y., assignor, by mesne assignments, to Eastman Kodak Company, Jersey City, N. J., a corporation of New Jersey Application June 11, 1935, Serial No. 26,019

9 Claims. (Cl. 33—172)

The present invention relates to an indicating system for a motion picture apparatus and more particularly to an indicating system which facilitates dark room loading of the apparatus.

The present invention will be described with respect to a motion picture firm magazine but is also adapted for use on motion picture cameras, projectors, etc.

One main object in the design of a film magazine is to produce a very compact magazine. Placing the indicating means in an embossing or forming in the cover of the magazine casing contributes to compact design of the film magazine. However, the indicating means includes a projection for engaging the outer convolution of the film roll and is preferably spring pressed so that said projection strikes against said outer convolution. The normal position of the indicating means and its projection complicates assembly of the film magazine because the projection may be over the side or edge of the film roll and mutilate the same after the cover is forced onto the casing. Furthermore, this assembly of the magazine must be accomplished in a dark room to prevent fogging the light-sensitive material of the film roll.

The primary object of the present invention is the provision of an indicating system that can be located so that the projection will not mutilate the film roll and includes a finger-piece for holding the indicating means and its projection in such location for easy fitting of the magazine cover.

A further object of the invention is the provision of an indicating system which permits assembly of a film magazine solely by using the sense of touch of the operator so that the assembly can be readily accomplished in a dark room.

A further object of the invention is the provision in an indicating system of co-operating grooves and a beaded margin to form light-sealing joints for the magazine container and contributing to the manual control of the movable member in the indicating means.

Still another object of the invention is the provision of a masking member which, in addition to assisting in the manual location of the indicating means, also acts to limit the movement of the indicating member in such an indicating means. Other and further objects of the invention will be suggested to those skilled in the art by the description which follows.

The above and other objects of the invention are embodied in a magazine cover which is provided with an embossing and which carries an indicating member within said embossing. A projection on the indicating member is normally moved into engagement with the outer convolution of a film roll in the magazine casing and a finger-piece is connected to the indicating member and is available from the exterior of the magazine. The finger-piece permits movement of the indicating member throughout its range or permits holding the indicating member in any predetermined position. A masking member partially encloses the indicating member within said forming, has a groove for co-operating with the beaded margin of the indicating member to perform a light-sealing function and also has portions abutting the projecting member to limit the movement thereof.

Reference is hereby made to the accompanying drawing wherein similar reference characters designate similar elements and wherein:

Fig. 1 is a film magazine provided with an indicating system according to the present invention and with part of the cover broken away for better illustration of the internal parts.

Fig. 2 is a transverse cross-section through said film magazine taken on the line 2—2 of Fig. 1.

Fig. 3 is a fragmentary cross-section through the embossing and indicating means taken on line 3—3 of Fig. 1.

Fig. 4 is a section through the forming in the magazine cover and is taken on the line 4—4 of Fig. 3.

The film magazine which provides the setting or background for the present invention will first be described. The particular characteristics of the film magazine are immaterial but may be of the type which comprises a casing 10 having lateral walls 11. Offset portions 12 are provided along the margins of lateral wall 11. A cover 13 has a rim 14 for engaging the offset portion 12 along the outer margin of lateral wall 11. When the cover 13 is fitted into casing 10 a light-tight container for a film supply is provided.

The front lateral wall 11 of the casing 10 may be provided with an exposure aperture, not shown, and a presser pad 15 supports the film F opposite the exposure aperture, being resiliently held against film F by a spring 16 which is supported by a pair of posts 17. A flexible shutter 18 is slidably mounted along lateral wall 11 and may be operated by a pin 19 to a closed position to cover said exposure aperture or may be moved to an open position to uncover said exposure aperture.

The film magazine contains a pair of rotatably mounted film rolls. The supply film roll 20 is coiled upon a core 21 which is adapted to be rotatably supported upon a supply spindle 22 on the casing 10 of the magazine. A film sprocket 23 is rotated by a shaft 24 to conduct the film in a preformed loop from supply roll 20 to the take-up roll 25. The film loop is disclosed as of the type which encircles one of the film rolls and requires a double layer of film over one side of sprocket 23. This double layer of film is guided by a pair of guide rolls 26 and by a spindle 27. The take-up roll 25 is wound upon a core 28 which is connected to the take-up spindle 29. This particular type of film path also contributes to compact design of the film magazine but the present invention is not limited to any specific film path, the invention being quite independent of the intermittent movement of the film through the film loop.

The cover 13 is fastened securely in place upon the casing 10 by means of a pair of bolts 30 which pass through the cover 13 and are threaded into the ends of spindles 22 and 29.

According to the illustrated or any other conventional form of film movement, the supply film roll decreases in diameter upon operation of the apparatus while the take-up film roll has a corresponding increase in diameter. It is customary to measure the amount of film that has been moved or remains in the apparatus by an indicating means which makes contact with the outer convolution of one of said film rolls. The indicating means of the invention is described as engaging the supply film roll but footage indications may be taken from either roll. The cover 13 is provided with an embossing or forming 31. Such embossing 31 may have any suitable formation but is here disclosed as being circular and provided with an annular groove 32. An indicating means is movably mounted within embossing 31 and comprises an indicating member 33 having a beaded margin 34 and carrying a projection 35. One surface of indicating member 33 is provided with a graduated scale 36. The forming 31 is provided with an opening 37 through which the graduations on scale 36 can be observed. A pointed 38 may extend into opening 37 to form an index over the graduations of scale 36 and a window 39 may be provided over opening 37 to keep the dust and dirt out of the interior of the indicating means.

A support 40 is centrally journaled in the embossing 31 and is riveted to the center of indicating member 33. Said support 40 mounts member 33 for movement or rotation within embossing 31, with beaded margin 34 within annular groove 32, and with projection 35 extending into the casing of the magazine for engagement with the supply film roll 20.

A resilient means normally moves the indicating means so that projection 35 is normally in contact with the outer convolution of film supply roll 20. Such a resilient means may be composed of a spiral spring 41 which has one end 42 fastened to embossing 31 by a rivet 43 and which has the other end 44 anchored in a slot 45 within support 40. With the cover 13 fitted onto the casing 10, the resilient means or spiral spring 41 normally moves the indicating means so that projection 35 engages the outer convolution of film roll 20, see Fig. 1.

As the diameter of film roll 20 decreases, the projection 35 moves in a counter-clockwise direction, see Figs. 1 or 4, and the graduations also move in a counter-clockwise direction past pointer 38. As a result, the projection 35 of the indicating means must have a range of movement into space previously occupied by convolutions of the film roll 20. If the indicating means is in a position for indicating an amount of film less than that actually in the supply film roll, then projection 35 will abut against the side of film roll 20 and prevent location of the cover 13 on casing 10 or else cause mutilation of the film opposite projection 35 upon forcing the cover 13 into the casing 10. Since the interior of the magazine is not readily available when the cover 13 is being fitted into casing 10, it is difficult to set the indicating means so that there will be no interference between projection 35 and the edges of film roll 20.

To overcome the difficulty just indicated, a finger piece is provided for permitting movement of the indicating means throughout its range and for holding the indicating means in any predetermined position. Such a finger piece is connected to the indicating member 33 and is available from the exterior of the film magazine. The finger piece 46 is integral with or attached to the support 40 and is flat to lie compactly along the cover 13. Obviously, the support 40 and finger piece 46 may be supplied in practice as an integral headed stud.

Although the friction between the operator's finger and the flat surface of finger piece 46 is generally sufficient to hold the indicating means in any desired position, a masking member is provided which assists in this holding of the indicating means and at the same time performs other functions to be more particularly described hereinafter. The masking member 47 is located in a shallow offset 48 in cover 13 and is fastened to cover 13 by a pair of rivets 49 and a pin 50. When the cover 13 is fitted on casing 10, the pin 50 is in a position over sprocket 23, see Fig. 1, so as to strip film from sprocket 23 or to prevent the film loop from bulging rearwardly within the magazine to engage the supply film roll 20. The masking member 47 is recessed to clear projection 35 and has a portion 51 and a portion 52 for abutting projection 35 in either of two extreme positions. The masking member 47 is also provided with a groove 53 which fits into the beaded margin 34 of the indicating member 33.

The support 40 is journaled in embossing 31 with sufficient play so that pressure exerted in an axial direction on finger piece 46 will move said finger piece 46 into frictional engagement with the outer surface of embossing 31, and/or move indicating member 33 into frictional engagement with masking member 47, and/or beaded margin 34 into frictional engagement with the groove 53 in masking member 47. The co-operation between beaded margin 34 and groove 53 insures and increases the frictional engagement between their supporting members so that less pressure on finger piece 46 is required to overcome the action of spiral spring 41 and to hold the indicating means in any predetermined position. When the indicating means is moved so that projection 35 abuts portion 52, and when the cover 13 is fitted into casing 10 projection 35 will be spaced, even from a full supply film roll 20, so that there will be no difficulty in fitting the cover into the casing and the film in roll 20 will not be mutilated. The assembling operator can move projection 35 into this extreme position and press upon finger piece 46 to hold the indicating means and projection 35 in such a position during fitting of the cover. Furthermore, the operator may grasp the cover 12 with two or three fingers and may place still another finger of the same hand against finger piece 46 to hold the indicating means in a fixed position, thus simplifying the handling of the cover during assembly. When finger piece 46 is released, spiral spring 41 will act upon the indicating means to move projection 35 against the outer convolution of film roll 20 and the indicating means will be ready to give accurate footage indications and to follow the film roll 20 as its diameter decreases.

Although groove 53 increases the frictional engagement between indicating member 33 and masking member 47, it also forms an additional light-sealing joint to protect the film within the magazine from being fogged by the light which may enter through the opening 37 in embossing 31. Thus masking member 47 performs three principal functions, one to assist in holding the indicating means in any desired position, another to provide additional light-sealing over the indicating means, and still another to limit the movement of projection 35 and to provide a positive stop in one extreme position thereof.

All of the operations necessary to set the indicating means and to hold the same in any set position as well as to fit the cover onto the casing can be performed solely by employing the sense of touch of the assembling operator. Since all of the operations can be performed by merely feeling the different parts, the assembling of the film magazine can be readily accomplished within a dark room.

The indicating system of the present invention is susceptible of many variations and modifications. Therefore, the scope of the invention is to be determined by the appended claims.

Having now particularly described my invention what I desire to secure by Letters Patent of the United States and what I claim is:

1. In a motion picture apparatus, the combination with a casing adapted to contain a film roll, a cover for enclosing said casing, and embossing in said cover and provided with an opening, an indicating member movably mounted within said embossing and covering said opening, a projection on said indicating member for extending into said casing and for engaging said film roll, and a masking member across said embossing partially to enclose the same, of a finger piece connected to said indicating member, available from the exterior of the cover in closed position thereof, and arranged so that pressure on said finger piece promotes frictional engagement between said indicating member and said masking member to permit holding of said indicating member in any predetermined position.

2. In a motion picture apparatus, the combination with a casing adapted to contain a film roll, a cover for enclosing said casing, an embossing in said cover and provided with an opening, an indicating member within said embossing covering said opening and having a beaded margin, a projection on said indicating member for extending into said casing and for engaging the periphery of said film roll, a support for movably mounting said indicating member within said embossing, and a masking member across said embossing and having a groove fitting into the beaded margin of said indicating member, of a finger piece connected to the support for said indicating member and available at the exterior of said cover, said support having sufficient play so that pressure on said finger piece promotes a frictional engagement between the beaded margin of said indicating member and the groove of said masking member whereby said indicating member can be manually held in any predetermined position.

3. In a motion picture apparatus, the combination with a casing adapted to contain a film roll, a cover for enclosing said casing, an embossing in said cover and provided with an opening, an indicating member movably mounted within said embossing and covering said opening, a projection on said indicating member for extending into said casing and for engaging said film roll, and a masking member across said embossing partially to enclose the same and having portions for abutting said projection to limit the movement of said indicating means between extreme positions, of a finger piece connected to said indicating member, available from the exterior of the cover in closed position thereof, and arranged so that movement of said finger piece moves said indicating member to extreme and intermediate positions and so that pressure on said finger piece promotes frictional engagement between said indicating member and said masking member to permit holding of said indicating member in any predetermined position.

4. In a motion picture apparatus, the combination with a casing adapted to contain a film roll, a cover for enclosing said casing, an embossing in said cover and provided with an opening, an indicating member within said embossing covering said opening and having a beaded margin, a projection on said indicating member for extending into said casing and for engaging the periphery of said film roll, a support for movably mounting said indicating member within said embossing, and a masking member across said embossing, having a groove fitting into the beaded margin of said indicating member, and having portions for abutting said projection to limit the movement of said indicating means between extreme positions, of a finger piece connected to the support for said indicating member and available from the exterior of said cover for moving said indicating member to extreme and mean positions, said support permitting pressure on said finger piece to promote frictional engagement between the beaded margin on said indicating member and the groove in said masking member for holding said indicating member in any desired position.

5. In a motion picture apparatus, the combination with a casing adapted to contain a film roll, a cover for enclosing said casing and provided with an opening, an indicating means completely enclosed by said casing and cover, including an indicating member movably mounted on the inner side of said cover and visible only through the opening therein, a projection on said indicating member extending into said casing, and a resilient means for normally moving said indicating member to bring said projection against the outer convolution of said film roll, of a support journalled in said cover, connected to said indicating member which is on the inner side of said cover and having a finger portion which is external to said cover and which constitutes the only external manual control of said indicating means.

6. In a motion picture apparatus, the combination with a casing adapted to contain a film roll, a cover for enclosing said casing and provided with a window, an indicating member completely enclosed by said casing and cover and including a projection, a support movably mounting said indicating member on the inner side of said cover for observation only through said window and with said projection located for movement into engagement with the outer convolution of said film roll, and a resilient means for normally moving said projection of the indicating member into said engagement with the outer convolution of said film roll, of a finger piece available from the outer side of said cover but connected to said indicating member on the inner side thereof and constituting the sole manual control for the indicating member and the projection thereof.

7. In a motion picture apparatus, the combination with a casing adapted to contain a film roll, a cover for enclosing said casing, an embossing in said cover encircled by a deep groove and provided with an opening, and an indicating means movably mounted on the inner side of said cover within said embossing to cover said opening and having a beaded margin fitting into said groove to form a light sealing joint, of a masking member on the inner side of said cover for encasing said indicating means within said embossing and provided with a groove fitting into the beaded margin of said indicating means to form another light sealing joint.

8. In a motion picture apparatus, the combination with a casing adapted to contain a film roll, a cover for enclosing said casing, an embossing in said cover encircled by a deep groove and provided with an opening, and an indicating means movably mounted on the inner side of said cover within said embossing to cover said opening, having a beaded margin fitting into said groove to form a light sealing joint, and including a projection extending into said casing for engaging the outer convolution of said film roll, of a masking member on the inner side of said cover for housing said indicating means within said embossing, provided with a groove fitting into the beaded margin of said indicating means to form another light sealing joint, and having portions for abutting said projection to limit the movement of said indicating means.

9. In a film magazine, the combination with a casing adapted to contain a film roll, a cover for enclosing said casing, an embossing in said cover having an annular groove and provided with a window, a circular indicating member having a beaded margin, and including a projection on said indicating member for extending into said casing and for engaging said film roll, a stud journalled in said forming and connected to said indicating member to support the same within said embossing and with said beaded margin within said annular groove, and a spiral spring between said indicating member and said embossing, having one end connected to said forming and the other end connected to said stud and for moving the projection on said indicating member into engagement with the periphery of said film roll, of a finger piece disposed outside of the cover of said magazine and connected to said stud for manual control and movement of said indicating member.

LAWRENCE R. MARTIN.